United States Patent
Fleming

(10) Patent No.: US 11,238,734 B2
(45) Date of Patent: Feb. 1, 2022

(54) SYSTEMS, METHODS AND/OR DEVICES FOR NAVIGATION

(71) Applicant: ARM IP Limited, Cambridge (GB)

(72) Inventor: Adeline-Fleur Fleming, Duxford (GB)

(73) Assignee: ARM IP Limited, Cambridge (GB)

( * ) Notice: Subject to any disclaimer, the term of this patent is extended or adjusted under 35 U.S.C. 154(b) by 202 days.

(21) Appl. No.: 16/368,689

(22) Filed: Mar. 28, 2019

(65) Prior Publication Data

US 2019/0325747 A1 Oct. 24, 2019

(30) Foreign Application Priority Data

Mar. 29, 2018 (GB) .................................... 18 05294

(51) Int. Cl.
| | | |
|---|---|---|
| *G08G 1/09* | (2006.01) | |
| *B60W 50/14* | (2020.01) | |
| *B60W 40/04* | (2006.01) | |
| *G08G 1/0968* | (2006.01) | |

(52) U.S. Cl.
CPC ....... *G08G 1/096838* (2013.01); *B60W 40/04* (2013.01); *B60W 50/14* (2013.01); *G08G 1/096844* (2013.01); *G08G 1/096855* (2013.01)

(58) Field of Classification Search
CPC ....... G08G 1/096838; G08G 1/096844; G08G 1/096855; G08G 1/096816; G08G 1/096811; G08G 9/00; B60W 50/14; B60W 40/04; G01C 21/3484; G01C 21/3492; G01C 21/3453; G01C 21/20; G06Q 10/047
See application file for complete search history.

(56) References Cited

U.S. PATENT DOCUMENTS

| | | | |
|---|---|---|---|
| 6,314,365 B1 * | 11/2001 | Smith .................... | G01C 21/30 340/988 |
| 9,188,985 B1 * | 11/2015 | Hobbs ................ | G01C 21/3626 |
| 2006/0291396 A1 | 12/2006 | Hamilton et al. | |
| 2008/0262710 A1 | 10/2008 | Li | |

(Continued)

FOREIGN PATENT DOCUMENTS

| | | |
|---|---|---|
| GB | 2495375 A1 | 4/2013 |
| WO | 2009023219 A1 | 2/2009 |

OTHER PUBLICATIONS

Examination Report under Section 18(3) App. No. GB1805294.4, dated Apr. 9, 2020, 5 Pages.

(Continued)

*Primary Examiner* — Rodney A Butler
(74) *Attorney, Agent, or Firm* — Berkeley Law & Technology Group, LLP

(57) ABSTRACT

The present techniques disclose, in at least one embodiment, a method of generating route instructions, the method comprising: receiving, at a control system, route requests from a plurality of users; selecting, at the control system, paths from one or more path networks to satisfy the respective route requests, wherein the paths are selected based, at least in part, on or responsive to one or more path criteria for the respective paths; generating, at the control system, route instructions for the respective route requests, wherein the route instructions comprise the selected paths; transmitting, from the control system to the plurality of users, the respective route instructions.

20 Claims, 9 Drawing Sheets

(56) References Cited

U.S. PATENT DOCUMENTS

| | | |
|---|---|---|
| 2009/0299629 A1 | 12/2009 | Grigsby et al. |
| 2015/0051822 A1 | 2/2015 | Joglekar |
| 2015/0168169 A1 | 6/2015 | Caceres et al. |
| 2017/0187993 A1* | 6/2017 | Martch .................... G01S 1/00 |
| 2017/0351255 A1 | 12/2017 | Anderson et al. |
| 2018/0188053 A1* | 7/2018 | Fukuda ................ G08G 1/0145 |

OTHER PUBLICATIONS

Combined Search and Examination Report Under Sections 17 AND 18(3), App. No. GB1805294.4, dated Sep. 28, 2019, 8 Pages.
Weyns, "Anticipatory Vehicle Routing using Delegate Multi-Agent Systems", Proceedings of the 2007 IEEE, Intelligent Transportation Systems Conference, Seattle, WA, USA, Sep. 30-Oct. 3, 2007, pp. 87-93.
Examination Report under Section 18(3), App. No. GB1805294.4, dated Nov. 25, 2021, 5 Pages.

\* cited by examiner

SYSTEMS, METHODS AND/OR DEVICES FOR NAVIGATION

This application claims the benefit of priority to UK patent application number GB 18 05294.4 filed on Mar. 29, 2018, which is incorporated herein by reference in its entirety.

BACKGROUND

The present techniques relate to systems, methods and devices for determining and providing route instructions to a user.

Navigation systems which use GPS (Global Positioning Systems) are known, whereby a navigation device in a vehicle provides route instructions to guide a human driver from an origin location to a destination location.

DETAILED DESCRIPTION

A navigation device generates route instructions for a driver based, at least in part, on preferences set by the driver. Some devices navigate the driver via a "fastest route" (e.g. via motorway) or via "most efficient route".

The present techniques seek to provide improvements to known navigation devices.

According to a first technique there is provided a method of generating route instructions, the method comprising: receiving, at a control system, route requests from a plurality of users; selecting, at the control system, paths from one or more path networks to satisfy the respective route requests, wherein the paths are selected based, at least in part, on or responsive to one or more path criteria for the respective paths; generating, at the control system, route instructions for the respective route requests, wherein the route instructions comprise the selected paths; transmitting, from the control system to the plurality of users, the respective route instructions.

According to a second technique there is provided a control system to perform the method of the first technique.

According to a third technique there is provided a method of implementing route instructions, the method comprising: transmitting, from a route device to a control system, a route request comprising a request for directions from an origin location to a destination location; receiving, at the route device from the control system, route instructions comprising one or more paths, the one or more paths selected based, at least in part, on or responsive to one or more path criteria; implementing, at the route device, the route instructions.

According to a fourth technique there is provided a route device to perform the method of the third technique.

According to a fifth technique, there is provided a navigation system comprising a route device and a control system.

Techniques described herein are diagrammatically illustrated, by way of example, in the accompanying drawings, in which.

The present techniques provide systems, methods and/or devices for determining, generating and/or providing route instructions to a user and will be described more fully hereinafter with reference to the accompanying drawings. Like numbers refer to like elements throughout.

The term "route instructions" as used herein is to be interpreted broadly, and in embodiments refers to instructions to route a user between an origin location and a destination location. As implemented by a route device, route instructions may be provided to the user as, for example, a series of text instructions, graphical instructions on a GUI, and/or voice instructions via a speaker. Additionally, or alternatively, as implemented by a route device, the route instructions may result in generation of command instructions by route device to control one or more further devices as will be described in detail below.

A route may comprise one or more paths of one or more path networks whereby the term "path" as used herein is to be interpreted broadly, and is not limited to any particular type of road, carriageway, or walkway, and may be a cycle-path, pedestrianized walkway, motorway, dual-carriageway, primary or 'A' road, secondary or 'B' road, driveway etc. and is also intended to cover a notional path through a waterway along, such as by a boat (e.g. along canals, rivers, oceans), and is also intended to cover a flight-path, such as along which an airplane, helicopter or unmanned aerial vehicle (UAV) may traverse.

The term "path network", as used herein is to be interpreted broadly and refer to one or more paths of a geographical area. A path network may further comprise one or more further path networks. For example, a first path network may be representative of a country, and may further comprise multiple further path networks, such as comprising a town, city, county or other geographical area in the country. Additionally or alternatively, a path network may comprise one or more type of paths, whereby, in an embodiment, a first path network may comprise only motorways; a second path network may comprise only primary roads; whilst a third path network may comprise both motorways and secondary roads.

The term "user" as used herein is to be interpreted broadly, and in embodiments refers to a human having an associated route device. As will be appreciated a route device may comprise a personal navigation device, a mobile device (e.g. a mobile phone, laptop etc.) or a route device may be part of a vehicle on-board vehicle navigation system. In some embodiments the term "user" refers to a human having an associated computer or computerised system in a vehicle with a route device incorporated therein.

The term "vehicle," as used herein is to be interpreted broadly and refers, for example, to motorcars, motorcycles, pushbikes, vans, trucks, boats, airplanes, etc. Such vehicles may be partially- or fully-under the control of a human user or may be partially- or fully-autonomous, under the control of one or more computer devices.

Figure 1:
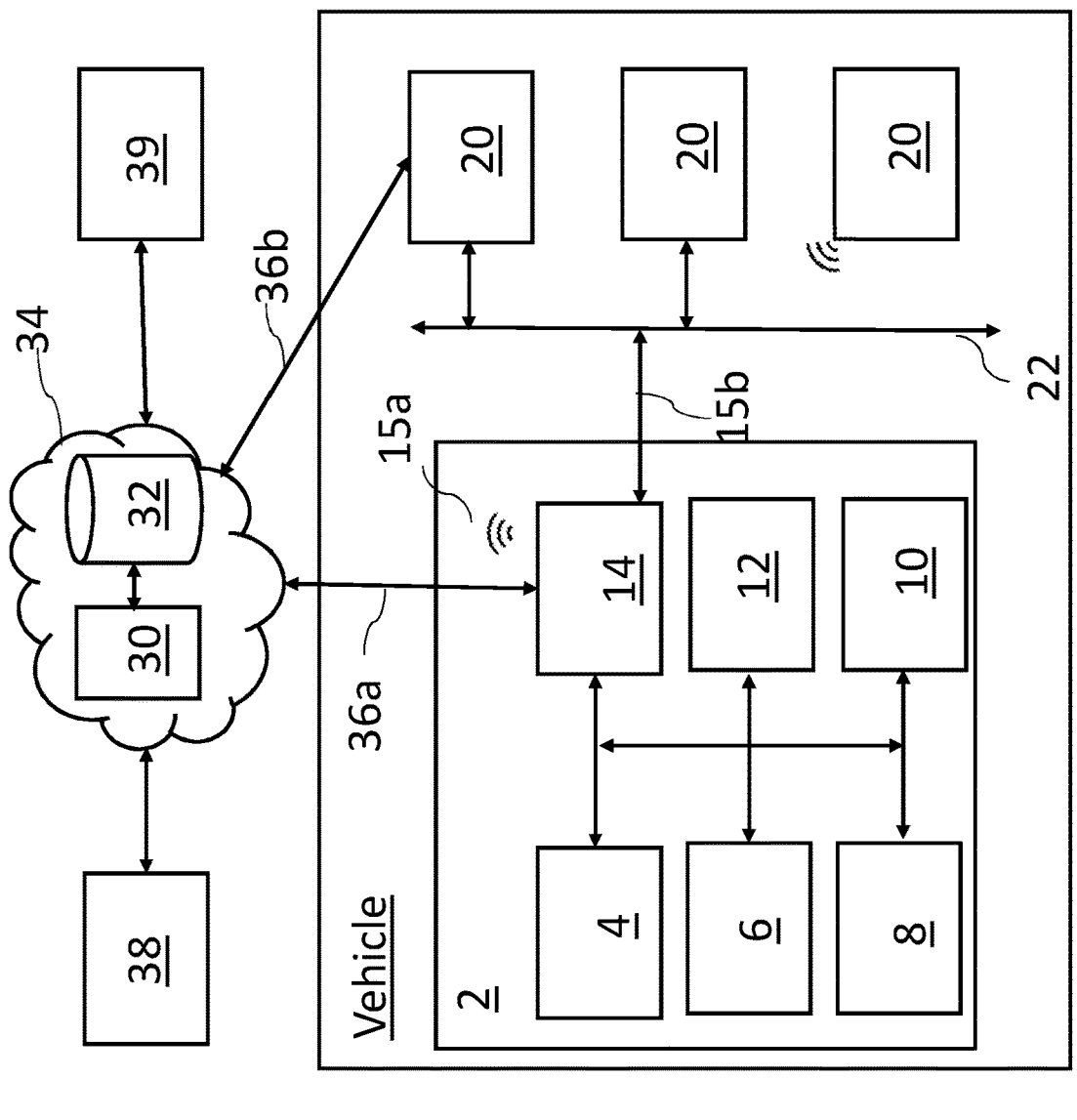
FIG. 1 shows an example of a navigation system according to an embodiment.

FIG. 1 schematically shows a navigation system 1, comprising a vehicle having an associated route device 2.

Route device 2 comprises processing circuitry 4, such as a processor(s) or integrated circuit(s) for processing signals and/or states in a memory and for controlling various operations thereof.

Route device 2 also comprises input/output (I/O) circuitry 6, whereby the I/O circuitry 6 may comprise a display (e.g. an electronic ink, organic light emitting diode (OLED), liquid crystal display (LCD), etc.), which may be used to provide information to a user e.g. via a graphical user interface (GUI).

I/O circuitry 6 may also comprise a user input function, whereby the user may input requests or select functions via the GUI. In other examples the user may input requests or select functions via one or more physical buttons in the vehicle or via a microphone using voice commands.

I/O circuitry 6 may comprise a speaker to provide sounds or spoken instructions to a user. The I/O circuitry 6 may, additionally or alternatively, be used to generate command instructions to control one or more functions of the vehicle, as will be described in greater detail below.

Route device 2 also comprises location determination circuitry 8, which may generate one or more locations relating to the vehicle's geographical position (e.g. longitude, latitude, and altitude/elevation).

For example, location determination circuitry 8 may comprise a receiver (not shown) to receive signals from a navigation satellite system (NSS), such as the global NSS (GLASS) using global positioning system (GPS). Received signals may then, for example, be used to generate one or more locations, whereby the route device 2 may be programmed to generate one or more locations periodically (e.g. every second). The skilled person will appreciate that such locations are not limited to being generated every second, and in other embodiments, locations may be generated for any suitable period such as, for example, every: millisecond, $10^{th}$ of a second, 5 seconds, 10 seconds, 15 seconds, 20 seconds, 30 seconds, 45 seconds, 1 minute, 2.5 minutes or any period in between these periods.

Location determination circuitry may, additionally or alternatively to the NSS, comprise an inertial motion reference unit to generate measurements enabling determination of locations in the form of signals and/or undertake positioning exchanges with another resource (e.g. different user devices, or wireless transmitters along a path) so as to determine its position relative to those resources or to determine the positions of those resources, and generate one or more locations responsive to such positioning exchanges.

A location may be time stamped after being generated, and may be stored in storage circuitry 10, accessed by an application, and/or transmitted to a remote resource as will be described in greater detail below.

Storage circuitry 10 (e.g. non-volatile/volatile memory), may be used to store location signals and/or states, and may also be used to store software executable by the processing circuitry (e.g. applications and/or programs).

Storage circuitry 10 may also store signals and/or states provisioned on or generated by a route device such as route device 2, hereafter "device signals and/or states", which may include one or more device identifiers to identify the route device 2, which may comprise one or more of: universally unique identifier(s) (UUID), globally unique identifier(s) (GUID) and/or IPv6 address(es), although any suitable device identifier(s) may be used.

Device signals and/or states may also include stored authentication signals for use in authentication to establish trust/cryptographic communications between route device 2 and a remote resource, which stored authentication signals may include certificates (e.g. signed by a root authority), cryptographic keys (e.g., public/private keys; symmetric key pairs), tokens etc. Stored authentication signals may have been provisioned on route device 2 by an authorised party (e.g. by an owner, a manufacturer, or an installer).

Route device 2 also may comprise power circuitry 12 to power various circuitry and/or components therein. In examples, power circuitry 12 comprises a battery. Additionally, or alternatively, power circuitry 12 comprises an energy harvester (e.g. Wi-Fi harvester), which may be used to power various circuitry and/or components and/or to charge the battery. In other examples, power circuitry 12 may be connected to a vehicle's power supply.

Route device 2 also comprises communication circuitry 14 for communicating with one or more resources remote therefrom.

Communication circuitry 14 may use wireless communications 15a, such as communications used in, for example, cellular (e.g. 3G, 4G, LTE etc.), wireless local area networks (WLAN) and/or wireless sensor networks (WSN) such as Wi-Fi, ZigBee, Bluetooth, or Bluetooth Low Energy (BLE), radio frequency identification (RFID) or near field communication (NFC) LoRA, NB-IoT etc., using any suitable communications protocol. Wireless communications 15a may also comprise short range communication capabilities, such as radio frequency identification (RFID) or near field communication (NFC). As described above, route device 2 may use wireless communications to undertake positioning exchanges with another resource to generate one or more locations. As previously described, such positioning exchanges may include RSSI (received signal strength indicator), time of flight (TOF) and/or round-trip time (RTT) operations using, for example beacon detectors for Bluetooth, Wi-Fi, etc.

Route device 2 may communicate with one or more further components or devices 20 within a vehicle (hereafter "vehicle device") to transmit/receive electrical signals therefrom via wireless communications 15a, or via wired communications 15b. As an illustrative example, route device 2 may communicate with vehicle devices 20 via a wired communications bus, such as a Controller Area Network (CAN) bus 22.

Such vehicle devices 20 may include relatively simple I/O devices up to embedded computers, which may be used to generate vehicle signals that may be stored as signals and/or states such as, for example:

vehicle operational signals (e.g. instantaneous speed, average speed, fuel/battery level, current mileage, oil level; tyre level;

seatbelt sensors; light function; washer level function, trailer attached to hitch etc.);

vehicle status signals (e.g. maintenance overdue, checkup failed/timed out);

vehicle identification signals (vehicle ID number, license number, engine capacity etc.);

vehicle type or model signals (e.g. HGV or motorcar or tractor etc.);

user control signals (e.g. partially-autonomous or fully-autonomous);

vehicle function and/or mission signals (e.g. emergency services vehicle; police car etc);

user identification signals (e.g. driver age, insurance policy number; licence type (e.g. full/provisional or UK/European/International etc);

no of convictions; or number of license endorsements (e.g. points on licence);

other user status signals (e.g. subscribed member to AA; HSBC Bank customer etc.)

user preference signals (e.g. avoid motorways; route via most efficient route; avoid speed cameras etc.)

Route device 2 may also communicate with the one or more vehicle devices 20 to transmit command signals (e.g. instructions) thereto, to control one or more vehicle functions such as:

switch the ignition on/off;
turn the steering wheel;
increase/decrease the throttle;
apply/release the brakes;
switch on/off the direction indicators;
control the lights on the vehicle (e.g., by turning on/off the headlamps, parking brakes, fog lights, etc.)
activate a warning signals (e.g., sounding a horn; hazard lights)
locking/unlocking the doors Therefore, it will be appreciated that route device 2 may be used to communicate with one or more vehicle devices 20 so as to control a partially or fully autonomous vehicle responsive to route instructions.

Route device 2 may communicate with one or more resources remote from a vehicle included in navigation system 1. In an illustrative example, route device 2 may communicate directly with a control system such as control system 30 via communications link 36a (e.g. using built-in cellular capabilities within communication circuitry 14). Additionally, or alternatively, route device 2 may communicate indirectly with control system 30, such as depicted by communications link 36b, whereby the communications are provided via a vehicle device 20.

Control system 30 comprises associated processing circuitry (not shown) and storage circuitry (depicted as database 32), whereby, in the present illustrative example, control system 30 may be hosted "on the cloud" as part of a cloud computing system. In an implementation, such a cloud computing system may comprise remote servers accessible through a network to store, process and/or manage signals and/or states in connection with providing services through the network. Control system 30 may comprise one or more "cloud" services, such as an application service, a management service, analytics service etc, and may receive signals from one or more users (depicted as users 38) and/or control system 30 may harvest stored content from one or more resources, such as websites or the internet (depicted as 39).

In the present illustrative embodiment, control system 30 receives routes requests from one or more users and selects one or more paths from paths stored in the database 32 to satisfy one or more route requests.

Paths may be stored (e.g., as signals and/or states) in the database 32 as a data structure (e.g. a graph) comprising a plurality of edges (or lines), whereby an edge is representative of a path in a path network, and may further comprise a plurality of nodes (or vertices), whereby a node is representative of a feature at an end of or along a path as will be described in more detail below.

As an illustrative example, a node may be representative of an intersection between two or more paths. In a further illustrative example, a node may be representative of a Point of Interest (PoI) along a path (as described in further detail below). In a further illustrative example, a node may be representative of an action point, whereby an action point is indicative of a geographic location at which control system 30 should perform a particular action initiated by a user being proximate thereto. Such an action may be, for example, to communicate with a further control system 30 and/or to transmit a warning to a user. In embodiments, a particular action to be performed may be specified in node attributes as described herein.

Paths further comprise attributes to specify respective nodes, edges and/or features of which they are representative. In some embodiments such attributes may comprise annotations in a data structure.

In embodiments, node attributes may comprise, for example: locations to specify a geographical position for a feature represented by the node; and/or node type attributes to specify node type (e.g. intersection node, PoI node, action node).

Node attributes may also comprise PoI attributes to specify aspects about the PoI for which a node is representative.

Such PoI attributes may specify type of PoI represented by a particular node, for example: a hotel, a shopping centre, post office, a leisure complex, a church, a zoo, a playground, a carpark, a speed camera. It will be appreciated that this list is exemplary only and is not an exhaustive list.

PoI attributes may also comprise further features for a different PoI (e.g. locations, opening times, closing times, telephone number, current carpark capacity, upcoming events, a phone number, a website address associated with a PoI).

Node attributes may also specify one or more permitted or restricted actions for a particular node. For example, node attributes may indicate that there is no left turn at a particular intersection, or that there are traffic lights at the particular intersection.

In embodiments, edge attributes may comprise, for example: an edge location, to specify a geographical position for a path represented by an edge (or multiple positions therealong), and an edge type to specify the type of edge (e.g., cycle-path, pedestrianized walkway, motorway, dual-carriageway, primary or 'A' road, secondary or 'B' road, driveway, waterway, flight-path, etc.).

Edge attributes may also comprise further attributes about a path for which an edge is representative, which may, for example specify one or more path criteria as described below.

Edge attributes may also specify one or more permitted or restricted actions for a path. For example, edge attributes may indicate a particular path is restricted to certain types of vehicles, or that certain credentials are for travelling along a particular path (e.g., a valid insurance policy; fully taxed vehicle; a full driver licence; a driver over a certain age, a user of a certain type (e.g., a partially or fully autonomous vehicle).

In an illustrative example, a user may be presented with some or all features specified by node and/or edge attributes, which may appear overlaid on a map presented thereto.

In another illustrative example, control system 30 may take account of node and/or edge attributes in connection with route generation for a user, and may select paths for route instructions based, at least in part, on or responsive thereto.

In some examples, an administrator of control system 30 or a PoI may update one or more attributes (e.g. via a GUI). As an illustrative example, a computer at a carpark may update a current number of available spaces at the carpark to control system 30, and PoI attributes updated accordingly, to be used in generation of route instructions (e.g., a carpark of path may only be selected as a destination if spaces are available).

Additionally, or alternatively, control system 30 may access a resource (e.g. a library, a database, and/or a webpage on the worldwide web) to harvest features of a scheduled event (hereafter "event features") and update the attributes based, at least in part, on or responsive to event features.

Such event features may include scheduled roadworks and/or planned maintenance events, as detailed at an appropriate resource (e.g., as provided by a public agency on a publicly accessible website server or on-line service).

As a further illustrative example, control system 30 may access a resource relating to a football stadium (e.g., an associated website or an online edition of a newspaper) to harvest aspects of an event. From a resource, control system 30 may identify that a football match is scheduled for a particular day and derive event features, such as, for example: a scheduled start time of the event; a scheduled end time; an attendance estimate; whether any traffic restrictions are identified in the vicinity; vehicle parking in the vicinity, etc.

Control system 30 then may determine an impact such an event would have on paths in proximity to the stadium (e.g., reduced capacity related to traffic restrictions; expected volume using a prediction of attendance or based, at least in part, on similar events in the past, etc).

Node attributes and edge attributes for nodes/edges of respective paths may be updated in accordance with stored aspects of event features, and control system 30 may take account of an attribute for selection of paths for routes at, or around the time a match is scheduled (e.g. ±1 hour from kick off).

It will be appreciated that control system 30 may identify event features for many different types of events such as running races, bicycle races, a parade or concert. Control system 30 may take account of attributes for selection of paths of the routes at or around the time the event is scheduled and generate route instructions accordingly.

Additionally, or alternatively, control system 30 may access a resource to obtain up to date or realtime attributes for one or more nodes and/or edges. In examples, such a resource may provide attributes relating to current traffic status for a particular route and/or whether there are any accidents (e.g. as provided by as provided by a public agency on a publicly accessible website server or on-line service including, for example, county councils' websites; city council websites; etc.).

Additionally, or alternatively users may, via respective route devices, manually update attributes e.g., via a GUI and a touch display. In other examples, route device 2 may be voice activated, whereby a user provides a voice command by saying a keyword or phrase, the keyword or phrase being recognised by route device 2 as an instruction to update an attribute. Examples of keywords or phrases may include "Speed Camera", "Accident", "car stopped" "slip road closed", "Traffic Jam on opposite carriageway".

Route device 2 may then communicate with control system 30 to instruct control system 30 to update attributes for nodes and/or edges responsive to a voice command. In an illustrative example, a user may say the keyword "speed camera", route device 2 may instruct control system 30 to update one or more attributes to add a new node representative of a speed camera to a path, at a location along the path at which user uttered the keyword.

Control system 30 may then take account of an attribute for generation of routes for a user and may modify route instructions for users based, at least in part, on or responsive to a node attribute.

In embodiments, a user may request a route from a present location to a destination, whereby control system 30 provides route instructions based, at least in part, on or responsive to one or more path criteria.

Such path criteria may be set to specify a path capacity for a path, which is a number of users per unit time ((e.g. seconds, minutes, hours etc)) which can be accommodated on a path or a certain portion of a path. Additionally, or alternatively, path criteria may specify a threshold volume of users which may be accommodated on a path, or path criteria may specify a weight which a path can accommodate (e.g., for a path comprising a bridge), although it will be appreciated that this list is not exhaustive.

Path criteria may be specified to achieve a desired path performance, for example: average speed or users; levels of congestion, levels of safety (e.g. whereby partially or autonomous vehicles may be safer than human drivers, or whereby vehicles >4 m will hit a low bridge), and/or traffic density (e.g. to allow a safe distance between vehicles, and/or to enable vehicles to switch lanes).

Path criteria for a particular path may be specified in attributes relating to the particular path, and control system 30 can take account of attributes during selection of one or more paths to satisfy route requests for different users.

As will be appreciated, different types of paths may have different path criteria from one another (e.g. motorways vs primary roads vs secondary roads). As will also be appreciated, path criteria for a particular path may be affected by weather conditions, events (e.g. maintenance, speed restrictions, accidents, lane closures etc.), types of vehicles (e.g. heavy goods vehicles vs motorcycles).

By generating route instructions based, at least in part, on or responsive to path criteria for one or more paths, control system 30 may route users along different paths of a path network to distribute users across the path network in accordance with path criteria for different paths. Furthermore, a number of users routed along a particular path may be controlled for different times of the day, responsive to past or scheduled events, and/or responsive to weather conditions.

Such functionality means that users may be distributed across one or more paths in accordance with respective path criteria to provide improved path performance for during periods in which users are expected to traverse a particular path.

In embodiments, control system 30 may monitor one or more paths, and from a determination that a path fails to satisfy (or is predicted to fail to satisfy) one or more path criteria (e.g. a threshold path capacity, a threshold path weight, one or more user criteria (e.g. as derived from stored vehicle features)), control system 30 may take appropriate action.

In an illustrative example, control system 30 may restrict access to certain paths to one or more types of vehicles (e.g., partially or fully autonomous vehicles). Such functionality means that paths may be segregated by vehicle type, so as to provide improved safety.

In a further illustrative example, control system 30 may route one or more users off a particular path onto another path in accordance with one or more path criteria, whereby it may be determined that a path has exceeded, or is predicted to exceed, its threshold capacity, control system 30 can route one or more users off that path until predicted capacity is below the threshold.

Such functionality means that control system 30 can both reactively and proactively route users so as to satisfy path criteria for one or more paths.

Figure 2:
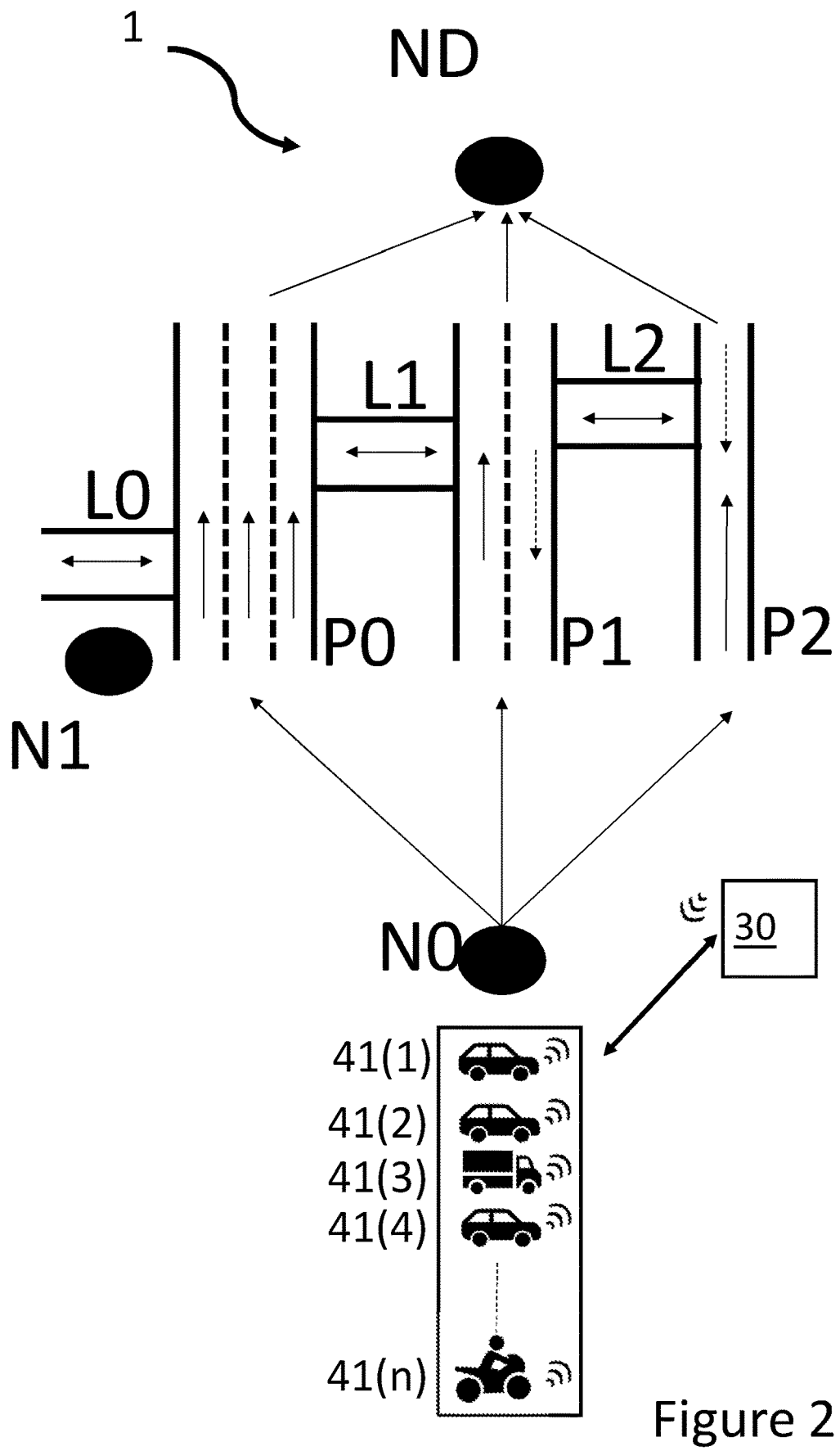
FIG. 2 shows an example of the navigation system according to an embodiment.

FIG. 2 shows an example of a navigation system 1 according to an embodiment, whereby navigation system 1 comprises a control system 30 which selects appropriate paths (P0-P2) and provides route instructions to users 41(1)-41(n).

Control system 30 may receive requests for routes (route requests) from a plurality of users (depicted as users 41(1)-41(n) (where 'n' is an integer)), whereby a route request may comprise a request for directions from an origin location (NO) (e.g., users current location as specified by first location in the route request) to a destination location (ND) (e.g. as specified by second location in the route request).

Although depicted to be the same for all users in FIG. 2, it will be appreciated that origin and/or destination locations may be different for some or all of users 41(1)-41(n).

In embodiments, control system 30 may process route requests from different users in order, whereby, for example, route requests may be queued in a buffer (not shown) at control system 30, and processed in a first-in-first-out (FIFO) order substantially in accordance with times that queued route requests are generated (e.g., from a timestamps on route requests provided by route devices) or based, at least in part, on times that control system 30 receives the route requests (e.g. based, at least in part, on timestamp provided on route requests by control system 30 on receipt of the route requests).

Control system 30 may select one or more paths from one or more path networks to satisfy route requests for respective users 41(1)-41(n) in accordance with path criteria for the selected one or more paths.

In an illustrative example, a determination that Path P0 (depicted as a motorway) fails to satisfy one or more path criteria (e.g., a threshold capacity, threshold weight), may result in control system 30 routing users to ND via path P1 (depicted as a primary road), and a determination that path P1 fails (or is predicted to fail) to satisfy the one or more path criteria thereof may result in control system 30 routing respective users 41 to ND via path P2 (depicted as a single lane road).

In addition, or as an alternative, to re-routing users, control system 30 may take an action, whereby such an action may comprise modifying one or more criteria of a particular path(s), so that the particular path(s) satisfies the one or more path criteria. As an illustrative example, control system 30 may communicate with road signage along a route (e.g. smart motorway signage) to open a lane (e.g. a hard shoulder) thereby increasing path capacity. In a further illustrative example, control system 30 may result in road signage along a path instructing all HGV's to pull into a nearest layby for a period of time, thereby reducing the volume of HGVs along the path, and increasing the capacity for other users.

In other embodiments control system 30 may prioritise some users over others as a result of processing requests, whereby control system 30 may route a prioritised user along a first path in accordance with that prioritised user's preferences, but route a non-prioritised user along a second path, contrary to that user's preferences. Such functionality means that the control system 30 may distribute users across a path network to meet path criteria of different paths rather than to meet preferences specified by users. As such, path performance for paths of a path network may potentially be improved.

In embodiments, control system 30 may monitor paths in realtime and determine whether or not a path satisfies one or more path criteria for that path based, at least in part, on or responsive to current path signals and/or states (e.g. realtime signals received from vehicles, users or systems). Therefore, responsive to an occurrence of an event on a certain path (e.g. if an accident occurs), control system 30 may reroute users based, at least in part, on or responsive to path criteria of other non-affected paths. As an illustrative example, if an accident occurs along path P0, control system 30 may route users 41 along paths P1 and P2 in accordance with respective path criteria for those paths. Such functionality means that users may not be routed down the same path (even if all user preferences are the same), but control system 30 may route users in accordance with path criteria for available paths. Such functionality may provide improved path performance along available paths.

Additionally, or alternatively, control system 30 may, before selecting a path for a route, determine whether or not that path satisfies one or more path criteria therefor based, at least in part, on or responsive to predicted path performance (e.g., predicted path performance derived or harvested by control system 30). For example, although a number of users on a particular path may exceed a threshold if a user sends route requests, control system 30 may predict path performance for a particular path at a time user is expected to traverse that particular path. As will be described in more detail below, a predicted path may be determined based, at least in part, on one or more of: event features (e.g., relating to historical or scheduled events), attributes, stored vehicle signals and/or states, etc. It will be understood that this list is exemplary only and is not an exhaustive list.

As an illustrative example of routing users based, at least in part, on predicted paths, control system 30 may, on processing a request from a user, determine that the capacity of Path P0 is currently at a threshold capacity but that a number of users may exit Path P0 at link path L0 following an event an N1, such that the capacity of Path P0 may fall below a threshold path capacity after the link road L0. Therefore, control system 30 may initially route a user along path P1 (e.g., if determined to be appropriate in view of path criteria for P1) and then route user to path P0 via link road L1, and then onto destination ND.

Such functionality means that users may be routed via a less preferable route until a user's preferred route is available, whilst providing for an improved path performance along the length of the different paths of the path network for all users.

Figure 3:
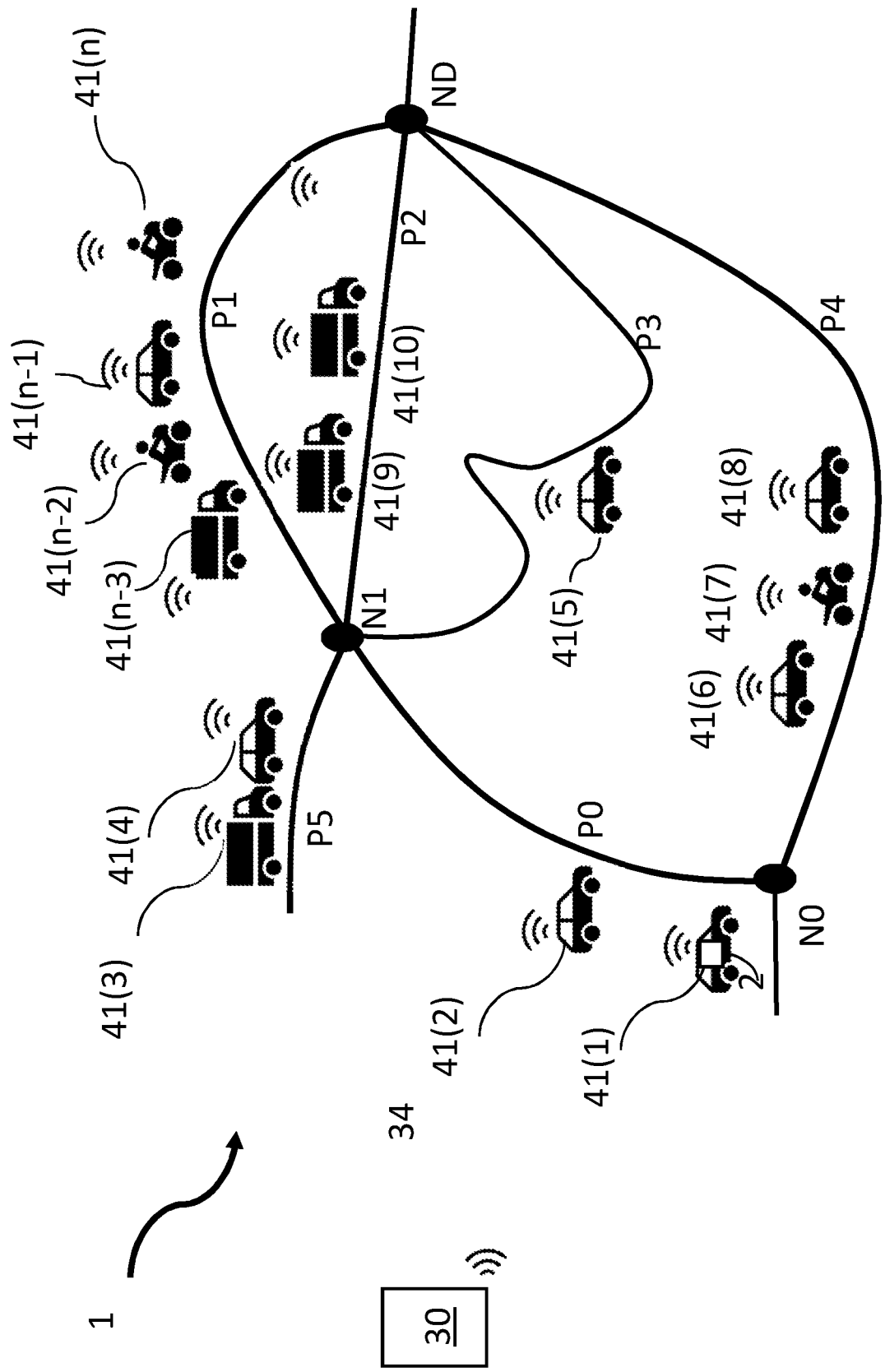
FIG. 3 shows an example of the navigation system according to an embodiment.

FIG. 3 shows an illustrative example of navigation system 1, wherein control system 30 provides route instructions to route devices 2 of a plurality of users 41(1)-41(n), so as to guide users along paths P0-P5 (which may be in one or more path networks).

In the present illustrative example, user 41(1) transmits a request to control system 30 for route instructions between its present location (depicted as origin node NO) and a destination (depicted as destination node ND). The request may also comprise a variety of features, e.g. location for the user, vehicle signals and/or states, etc.

In the present embodiment, on receiving a request, control system 30 identifies paths for different possible routes between NO and ND. In FIG. 3 routes between NO and ND are illustratively shown to comprise paths P0+P1; P0+P2; P0+P3; and P4.

In an embodiment, control system 30 selects paths for route instructions based, at least in part, on or responsive to path criteria for the respective paths.

As above, control system 30 may, before selecting a particular path, determine whether or not the particular path satisfies path criteria based, at least in part, on or responsive to current paths.

In the present illustrative example, a current path may comprise vehicle signals received from vehicles in realtime.

Current paths may also comprise sensed signals from cameras or sensors along a path (e.g. actively monitoring traffic along the path). Current paths may also comprise current weather for a path.

Control system 30 may also, before selecting a particular path, determine whether or not a particular path satisfies path criteria based, at least in part, on or responsive to predicted paths, whereby predicted path may be derived based, at least in part, on or responsive to vehicle signals collected from one or more users that have previously traversed a path at a given time, whereby vehicle signals of one or more users may provide details of, for example, speed (instantaneous or average speed) of a user at a given time and/or location. Over time control system 30 may, using deep learning analysis on a predicted path, identify patterns in performance at different times of day (e.g. 0830-0930 vs 1030-1130), and at different times of the week (e.g. Sunday vs Monday) or year (e.g. Christmas day vs May Bank Holiday).

A predicted path data may also be derived based, at least in part, on or responsive to event features relating to a previous event along that path, and the effect or impact that such an event had on the performance of the path and surrounding paths (e.g. due to the volume of traffic, type of vehicles etc.).

Control system 30 may also refine accuracy of a predicted path, by comparing predicted path performance with actual observed performance. If predicted path performance differs from actual performance, control system 30 may update a predicted path accordingly.

Additionally, or alternatively, a predicted path may be derived based, at least in part, on or responsive to path performance for similar weather conditions in the past.

It will be appreciated that a predicted path may also be derived based, at least in part, on or responsive to predictions and/or forecasts, whereby predictions and/or forecasts may provide details of, for example, future weather forecasts.

By generating routes for users 41 based, at least in part, on or responsive to predicted path for one or more paths in a path network, control system 30 may control a number of and types of users routed along different paths of a path network to achieve a particular path performance e.g., during a particular time of day, for forecasted weather and/or for a scheduled event.

Such functionality may provide for a more balanced load of vehicles on the one or more paths of a path network and also provide for a more controlled path performance, for example: reduced delays, more predictable traffic flow;

increased average speed; and/or a particular traffic density. Such functionality also means that a duration of a particular user's journey may be more accurately predicted than would otherwise be possible, whereby a time of arrival may be updated based, at least in part, on or responsive to a current path and/or predicted path.

If a user does not accept a route proposed by control system 30 (e.g. P0+P1) and insists on travelling the preferred route (e.g. P0+P2), control system 30 may advise user to delay a start of a journey along a preferred route for a period time until a particular path is determined to be meet path criteria. Such functionality means that a user may be provided with a particular timeslot to depart its current location so that path criteria for one or more paths along a route may be met, whilst providing a preferred route to a user.

In other embodiments, users may be incentivised to accept routes provided thereto even if such routes are contrary to that user's preferences. Such incentivisation may be provided in the form of a user reward system, whereby if a user accepts and traverses a route which is contrary to that user's preferences, control system 30 may subsequently route user in line with that user's preferences the next time a route is provided and/or if sufficient reward points have been have been allocated to the user, or funds may be deposited in an account associated with user. Such functionality means that users are more likely to follow routes, even if more preferable routes are possible.

Figure 4:
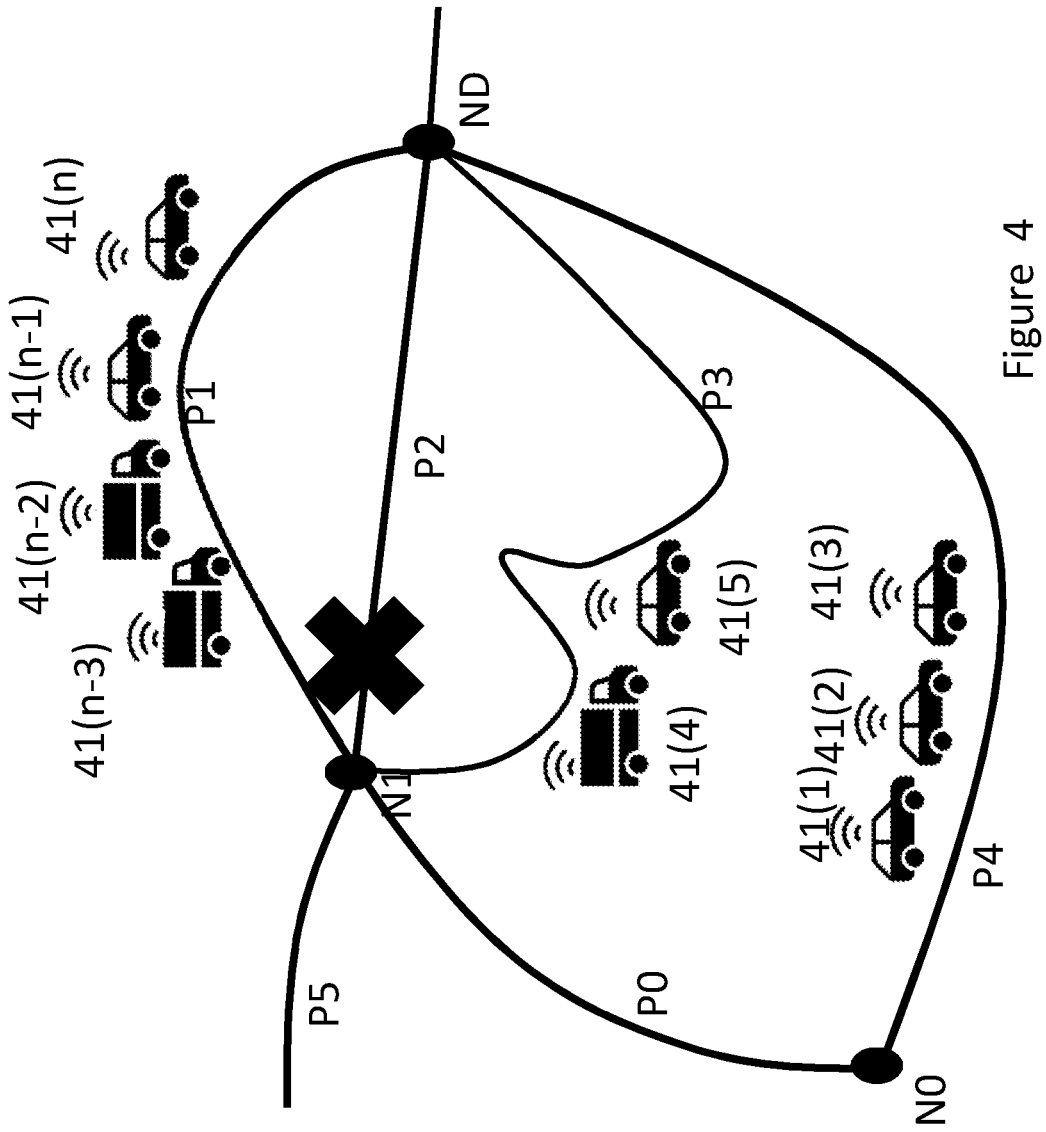
FIG. 4 shows an example of the navigation system according to an embodiment.

FIG. 4 shows a further illustrative example of navigation system 1, wherein control system 30 provides route instructions to route devices 2 of a plurality of users 41(1)-41(n) so as to guide users along paths P0-P5.

When one or more paths becomes inaccessible to some or all users, control system 30 may reroute users along one or more accessible paths so as to provide a balanced load across the accessible paths.

In the present illustrative example, path P2 is closed between node N1 and node ND (e.g. due to maintenance, an accident), and control system 30 routes users along one of paths P1, P3 and P4 in accordance with path criteria for respective paths.

Such functionality means that users may be distributed across the remaining paths P1, P3 and P4 in accordance with respective path criteria, thereby providing an improved path performance across paths than would otherwise be achieved (E.g., if only user preferences were taken into account).

Figure 5:
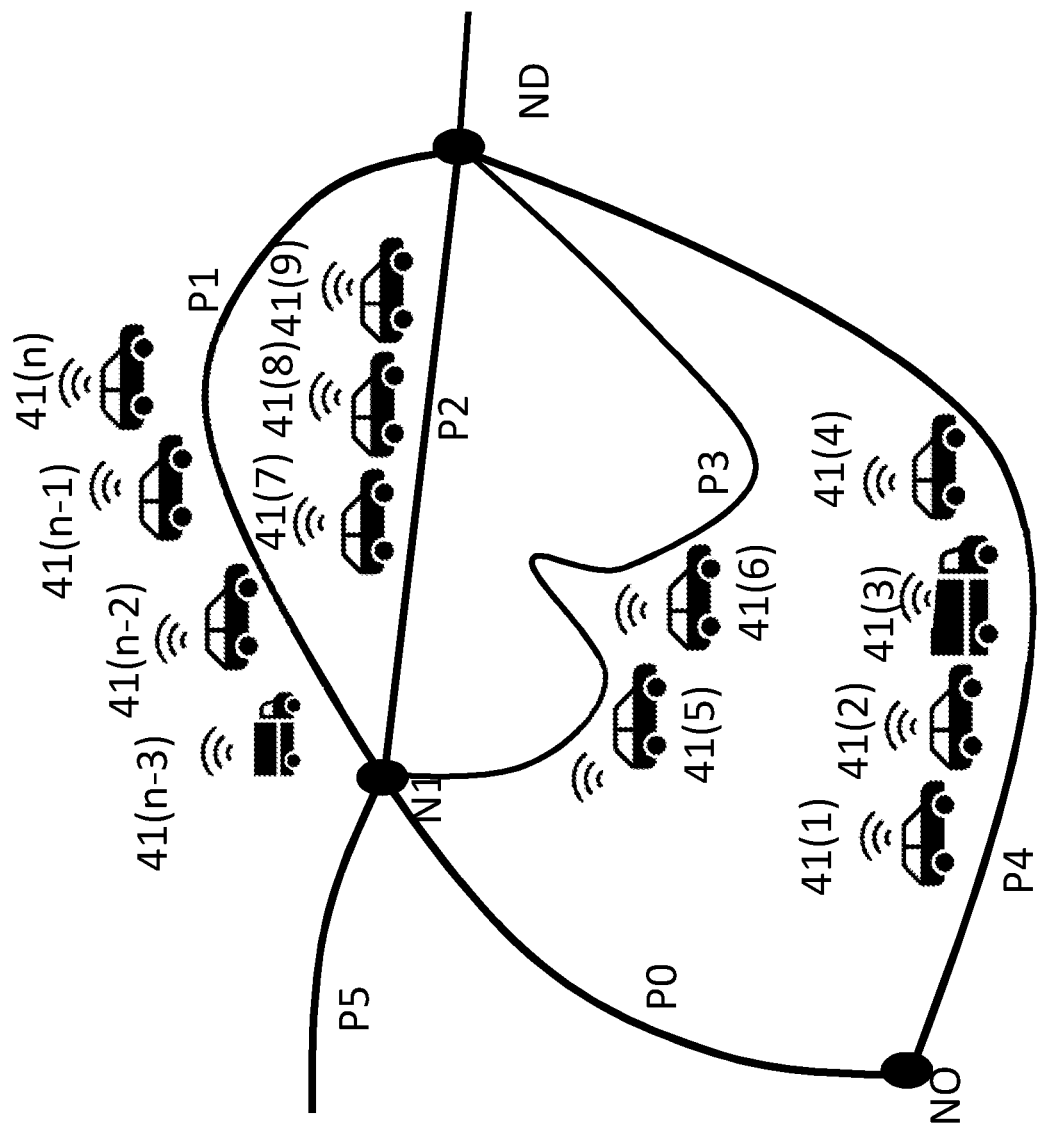
FIG. 5 shows an example of the navigation system according to an embodiment.
Figure 5:
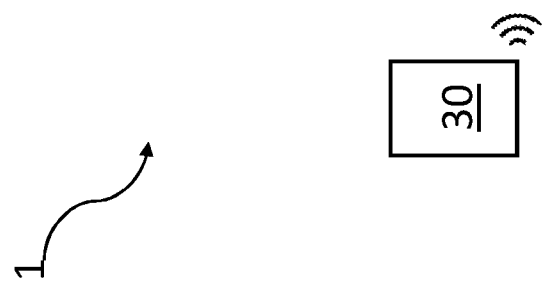

FIG. 5 shows a further illustrative example of navigation system 1, wherein control system 30 provides route instructions to route devices 2 of a plurality of users 41(1)-41(n), so as to guide users along paths P0-P5.

As described above, control system 30 generates routes responsive to user route requests by selecting paths for users based, at least in part, on or responsive to respective path criteria.

Control system 30 may consider user criteria in generation of route instructions, whereby a user criteria relates to user (hereafter user criteria) and may be taken into account by control system 30 in selecting paths.

In an illustrative example, a government may specify, in an edge attribute, that paths should be prioritised for emergency vehicles. As such, control system 30 may prioritise emergency response vehicles (e.g., depicted as 41(n)) over non-emergency vehicles (e.g. as specified in vehicle type signals of the vehicle signals and/or states), whereby control system 30 is to route emergency vehicles to ND in accordance with a user's preferences, whilst non-emergency vehicles may be routed in accordance with a user's preferences.

In a further illustrative example, a town council of a town may restrict commercial vehicles though the town centre during certain times (e.g. between 0700 and 0900). As such, control system 30 may prioritise non-commercial vehicles such as cars and motorcycles over commercial heavy goods vehicles (HGV) (e.g. as specified in the vehicle type signals of the vehicle signals and/or states), whereby control system 30 may not route HGVs along paths through the town during restricted times. Such functionality may provide improved safety and reduced congestion along different paths. Such functionality also means that users, such as HGVs may be routed so as to avoid congestion pinch points.

In a further illustrative example, a government may specify that access to certain paths is restricted to particular users. For example, a government may, via an edge attribute for a path, specify that a certain type of path (e.g. motorway) is restricted to users lacking certain credentials (e.g., a certain insurance policy, or a full driver licence), and control system 30 may route users in accordance with edge attributes. In a further example, some paths may be restricted to fully autonomous vehicles, whilst others may be restricted to non-autonomous vehicles. Such functionality may provide improved safety by segregating different paths to certain types of users. Such functionality also means that different types of users may be routed so as to avoid congestion pinch points at particular times of the day (e.g., rush hour).

In an illustrative example, a school board may set a node attribute to restrict certain users (e.g., with convictions for excessive speed or drink driving) from being routed via a school, and control system 30 may not route users along a path with that node in accordance with one or more node attributes.

In a further illustrative example, a church council may request that control system 30 limit a volume of traffic along one or more paths during a specific time (e.g., if a funeral cortege is scheduled to pass along the path), and control system 30 may not route or may restrict users along the path(s) which the funeral cortege is expected traverse during the specific time.

As a further illustrative example, a road management company with responsibility for a private toll road may restrict access for non-paying users along the private toll road during given times. A user, or an agent thereof, may pay a fee to the road management company such that control system 30 may route user along the private road.

In an illustrative example, control system 30 may prioritise users that are members or customers of a certain club or company over users that are not members of that club or company (e.g. as specified in user status signals of vehicle signals and/or states), whereby control system 30 may route members in accordance with the user's preferences, whilst non-members may only be routed to ND via P0 if path criteria for that path allows. Such a club or company may comprise, for example, a liftshare scheme (where two or more people share a journey in a vehicle); a bank; a creditcard rewards club; a motor association (e.g. AA, RAC). In examples, a user may provide an authorisation signal in the form of, for example: a serial no., a creditcard number; a liftshare scheme number, which the user may input at route device 2. In other examples, a user may have pre-registered its number plate at control system 30 or a website associated with a club or company, and this may be derived from vehicle signals and/or states by control system 30.

On verifying an authorisation signal, control system 30 may route a user along a restricted path in line with user preferences. If credentials are not verified, control system 30 may route a user via a path contrary to user preferences in accordance with path criteria.

In a further illustrative example, control system 30 may prioritise users attending an event. For example, control system 30 may route users via one or more paths to an event in accordance with path criteria, whilst routing users that are not attending the event via one or more paths avoiding the event unless path criteria are met for the one or more paths.

If a user requests a route that encompasses a path affected by the event, control system 30 may request an authorisation signal from the user to determine whether the user is actually attending the event. Such an authorisation signal may be in the form of, for example: a serial no., a barcode or QR code on a ticket, which a user may input at route device 2, and which may be transmitted to control system 30 for validation. In other examples, a user may have pre-registered its number plate at control system 30 or a website associated with the event, and this may be derived from vehicle signals and/or states by control system 30.

On verifying authorisation signals and/or states, control system 30 may route a user via an appropriate path to an event. If credentials are not verified, control system 30 may route the user via a different path, avoiding the event.

In addition to path criteria, control system 30 may update routes and transmit updated routes to a user in accordance with user criteria (e.g. as derived from vehicle signals and/or states). As an illustrative example, control system 30 may determine that a user's fuel level is low and may re-route user via a different path having a fuel station therealong. In other examples, biometric signals from a user may be transmitted to control system 30 (e.g. blood pressure, heart rate, eyelid movement) or processed at route device 2, and if it is determined that user is falling asleep or is stressed, control system 30 may reroute user via a path with a rest station.

Control system 30 may also transmit a warning to a user based, at least in part, on or responsive to user criteria, for example, via route device 2 by initiating emission of a sound warning from car speakers to notify user of low fuel or to initiate an opening of a driver's window to refresh or alert the driver, if determined to be appropriate. Additionally, or alternatively, control system 30 may initiate display of a visual warning to a user e.g., by initiating a flashing of a light on a dashboard or initiating a targeting and display of a message to user on road signage along a path which user traverses (e.g., "Take a Break+Number plate of user").

By selecting paths for users based, at least in part, on path criteria and user criteria, paths may not be selected for a user if determined to be unsuitable for that user.

As described above, a path network may comprise one or more path networks, where a path network may comprise one or more paths.

FIGS. 6a to 6d are illustrative examples of path networks 52, 54, 56, 58 from which a control system 30 may select paths to satisfy route requests from one or more users.

Figure 6B:
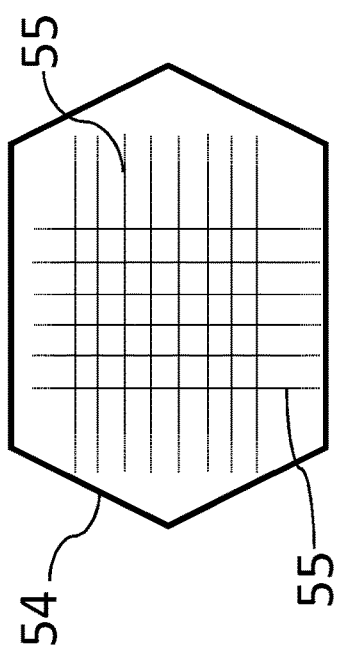
FIGS. 6a to 6d show examples of path networks from which one or more paths may be selected.
Figure 6C:
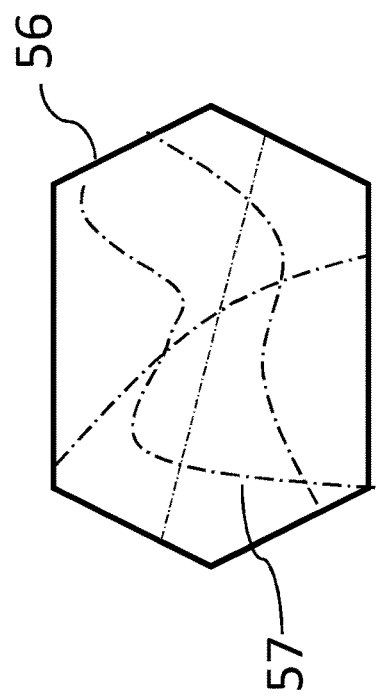
Figure 6A:
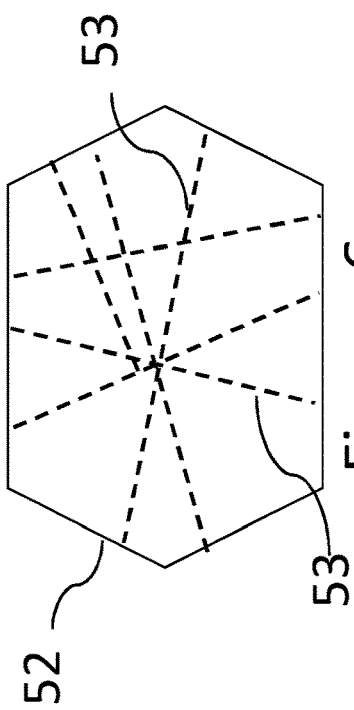

In the illustrative example of FIG. 6a, path network 52 comprises paths 53 of a first type (e.g. primary roads). In the illustrative example of FIG. 6b, path network 54 comprises paths 55 of a second type (e.g. secondary roads). In the illustrative example of FIG. 6c, path network 56 comprises paths 57 of a third type (e.g. motorways).

By segregating path networks by type, control system 30 may omit certain path networks from its calculations in determining an appropriate route for a user, thereby decreasing an amount of a path that is processed.

As an illustrative example, in determining routes if user criteria indicate that motorways are to be avoided (e.g., for a learner driver, or a vehicle unsuitable for a motorway (e.g., a bicycle)), control system 30 may omit network paths comprising motorways in selection of paths.

Figure 6D:
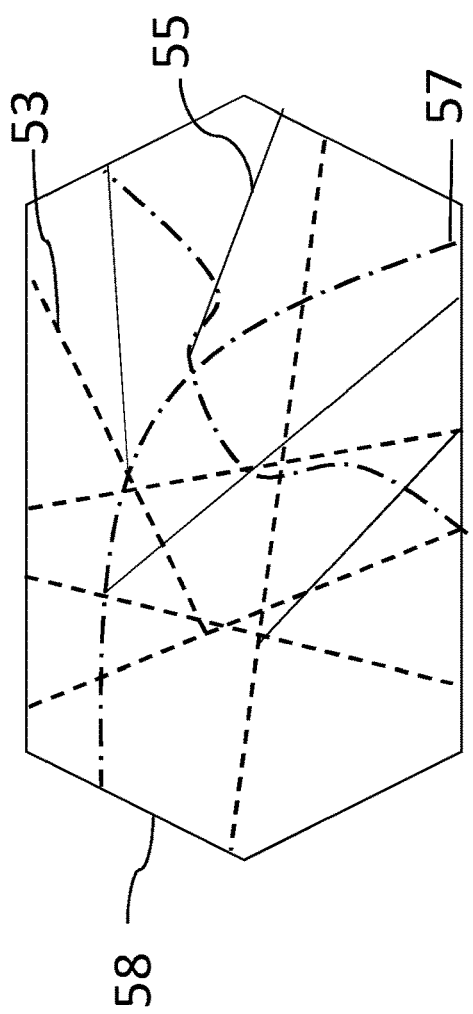

However, it will be appreciated that path networks may also comprise two or more types of paths, and in the illustrative example of FIG. 6d, path network 58 comprises multiple path types, whereby first to third types of paths 53, 55 & 57 are depicted.

In an embodiment, a single control system 30 may receive route requests from multiple users and select different possible paths from one or more path networks from an origin to a destination based, at least in part, on or responsive to path criteria for the different paths.

As an illustrative example, network path 58 may comprise different path types of a country, whereby a single control system 30 (not shown in FIG. 6d), may select a most appropriate path based, at least in part, on or responsive to path volumes of different paths and provide route instructions to a user.

However, in some embodiments a single control system 30 may not be suitable or capable of providing routes across the whole length of a route requested by a user. For example, if a user traverses between different countries, a country may have an associated control system 30 that is distinct from an associated control system 30 of another country. Therefore, different control systems may be responsible for monitoring and providing route instructions to a user as the user traverses the length of the route.

Figure 7:
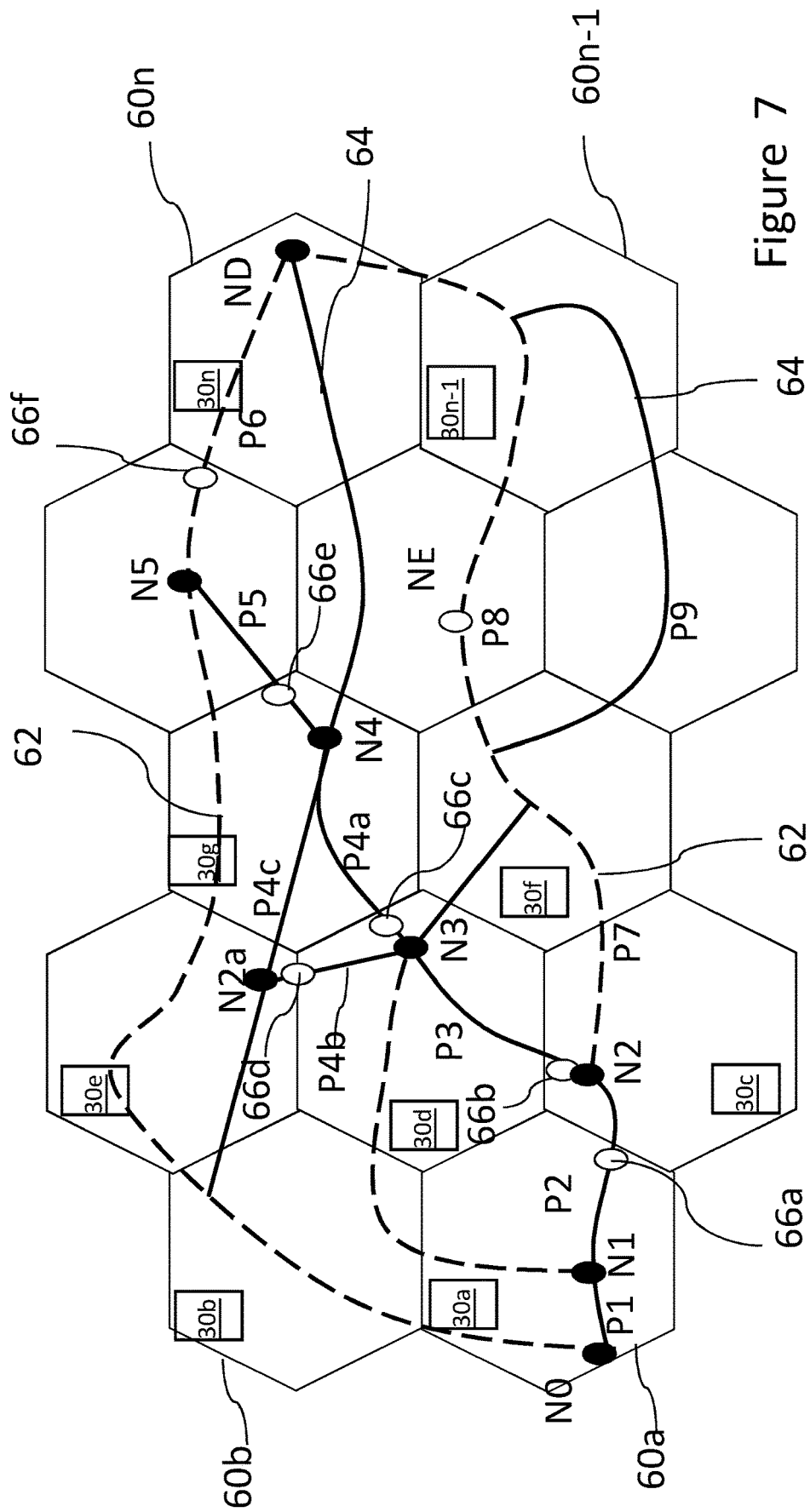
FIG. 7 shows an example of different path networks a user may traverse.

FIG. 7 shows an illustrative example of different path networks 60*a*-60*n*, whereby a path network 60*a*-60*n* may be representative of multiple paths in a geographical area (e.g. a country).

In FIG. 7, dashed lines 62 may be representative of a first path type (e.g. motorways) and solid lines 64 may be representative of a second path type (e.g. primary roads), although path networks are not limited to only having motorways and primary roads and may have others.

In an illustrative example of FIG. 7, path networks 60*a*-60*n* may have an associated control system 30*a*-30*n*, whereby a control system 30*a*-30*n* may determine an appropriate path for a user based, at least in part, on path criteria for respective paths.

In embodiments, control systems 30*a*-30*n* may communicate with one another to determine the most appropriate path for a user as user traverses between an origin node NO and a destination node ND.

In embodiments control system 30*a* selects paths only from its own path network, whereby route instructions for further path networks 60*b*-60*n* are provided by an associated control system 30*b*-30*n* and communicated to a user via control system 30*a*, or transmitted to user if determined to be appropriate (e.g., if user passes a particular point on a path).

In other embodiments control system 30*a* may select paths from one or more other path networks, whereby in an illustrative example control system 30*a* may communicate with one or more of control systems 30*b*-30*n* so as to determine appropriate paths from within those path networks 60*b*-60*n*.

On commencing a journey at an origin node 30*a* along paths P1 and P2, control system 30*a* may monitor a user, collecting vehicle signals and/or states therefrom, and may also monitor paths in a path network 60*a*, and update route instructions if determined to be appropriate as described above.

In an illustrative example, control system 30*a* may hand over or transfer responsibility for a user to control system 30*c* as user traverses path P2 between nodes N1 and N2, whereby node 66*a* comprises an action point such that if user passes action point 66*a*, control system 30*a* transfers responsibility for user to control system 30*c*. Such a transfer may include communicating user's route instructions to control system 30*c*.

Control system 30*c* may monitor a user and paths and update user's path if determined to be appropriate. For example, control system 30 may determine that, in view of a newly scheduled event at node NE on path P8, user should traverse to ND via P3, P4*a*, P5 and P6 in accordance with path criteria for those paths.

A user may then traverse paths in accordance with route instructions provided by one or more control systems 30, whereby an appropriate control system 30 may assume responsibility for user if user passes an action point 66*c*-66*f* along a route.

Furthermore, the various control systems 30*a*-30*n* may monitor performance of paths and users thereon, and provide updated route instructions to one or more users determined to be appropriate.

Such functionality may provide that control systems may generate routes for different users across different path networks (e.g., representative of different countries) comprising one or more paths, whereby route instructions may satisfy path criteria for one or more paths.

Figure 8:
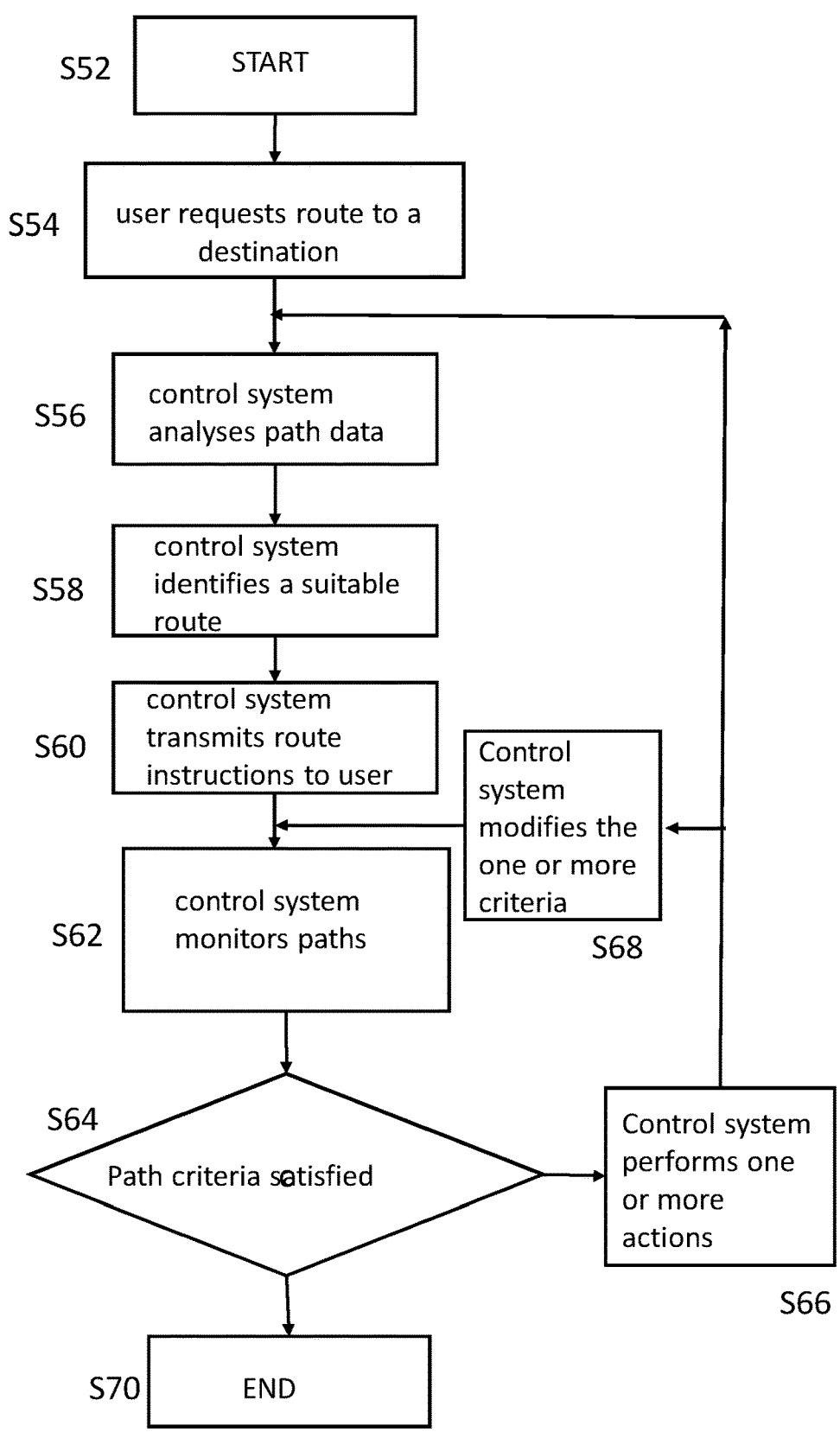
FIG. 8 is a simplified flow diagram illustrating a method of generating route instructions at a control system according to an embodiment.

FIG. 8 is a flow diagram illustrating a method 50 of generating route instructions for a user at a control system.

At S52, method 50 starts.

At S54, a control system receives, from a route device associated with a user, a route request to a destination location including a location to allow control system to determine user's present location and that of destination location.

At S56, control system analyses paths in an associated database and at S58 selects one or more paths from one or more path networks based, at least in part, on or responsive to path criteria for respective paths. The system may analyse node attributes and edge attribute for respective nodes and edges to determine path criteria at a time user makes a request and at the time user is expected to traverse a particular path. Such predictions may be based, at least in part, on a current path and predicted path for a respective path.

At S60, control system transmits route instructions to user, and at S62, monitors path performance for one or more paths, and at S64 determines whether one or more paths do not or are predicted to fail to satisfy respective path criteria.

At S66, if it is determined that one or more paths do not satisfy or are predicted to fail to satisfy respective path criteria control system performs an action whereby at S68 such an action comprises modifying one or more criteria of a particular path(s), so that path(s) satisfies one or more path criteria and/or such an action comprises generating updated route instructions based, at least in part, on or responsive to one or more path criteria.

As an illustrative example, control system may communicate with road signage along a route to open a lane thereby increasing path capacity.

At S70, method 50 ends.

Such functionality may provide for a more balanced load of users on one or more paths of path networks, and provide for a more consistent path performance for users traversing different paths. Such functionality also means that users, such as autonomous vehicles may be routed so as to avoid congestion pinch points.

Figure 9:
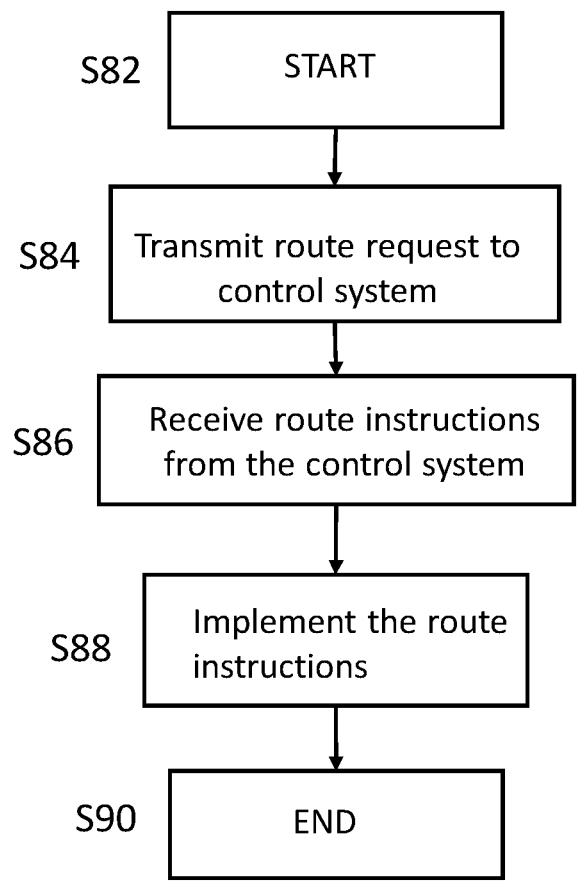
FIG. 9 is a simplified flow diagram illustrating a method of implementing route instructions at a route device according to an embodiment.

FIG. 9 is a simplified flow diagram illustrating a method 80 of implementing route instructions at a route device.

At S82, method 80 starts.

At S84, route device transmits, to a control system, a route request comprising a request for directions from an origin location to a destination location. In an illustrative example, route request may comprise location (e.g. GPS location) specifying location of an origin location and a destination location, although claimed subject matter is not limited in this respect.

At S86, route device receives route instructions from control system. As described above, route instructions may comprise one or more paths selected to satisfy one or more path criteria therefor.

At S88, route instructions may be implemented at route device, whereby, route instructions may be provided to user as instructions, for example, a series of text instructions, graphical instructions on a GUI, and/or voice instructions via a speaker.

Additionally, or alternatively, if implemented by route device, route instructions may initiate generation of command instructions from route device to control functionality of a vehicle. Such functionality means that route instructions may be used to control a partially or fully autonomous vehicle as it traverses between origin location and destination location.

At S90, the method 80 ends.

By routing users based, at least in part, on or responsive to one or more path criteria, user load may be distributed across path network so in line with one or more criteria, thereby providing for improved path performance for paths of path network.

Although techniques discussed herein particularly depict motor vehicles traversing different types of roads, claimed subject matter is not limited in this respect, and techniques may be used to provide route instructions to navigate many different types of users having an associated route device along one or more paths of one or more path networks. As illustrative examples, techniques discussed herein may be used to provide route instructions to navigate boats or ships from along rivers, canals, ports, channels, straits, and oceans. Furthermore, techniques discussed herein may be used to provide route instructions to navigate aircraft (e.g. airplanes, helicopter, gliders, unmanned aerial vehicles etc). Furthermore still, techniques discussed herein may be used to provide route instructions to navigate a human user (e.g. walking or on a bicycle).

Embodiments of techniques discussed herein may further provide a non-transitory data carrier carrying code which, if implemented on a processor, may control execution of processor to carry out methods described herein.

Techniques discussed herein may further provide processor control code to implement above-described methods, for example on a general-purpose computer system or on a digital signal processor (DSP). Techniques discussed herein may also provide a carrier carrying processor control code to, if running, implement methods described herein, in particular on a non-transitory signal carrier or on a non-transitory computer-readable medium such as a disk, microprocessor, CD- or DVD-ROM, programmed memory such as read-only memory (firmware), or on a signal carrier such as an optical or electrical signal carrier. Code may be provided on a (non-transitory) signal carrier such as a disk, a microprocessor, CD- or DVD-ROM, programmed memory such as non-volatile memory (e.g. Flash) or read-only memory (firmware). Code (and/or data) to implement embodiments of techniques discussed herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As a skilled person will appreciate, such code, signals and/or states may be distributed between or among a plurality of coupled components in communication with one another. Techniques discussed herein may comprise a controller which includes a microprocessor, working memory and program memory coupled to one or more components of a system.

Computer program code for carrying out operations for techniques discussed herein may be written in any combination of one or more programming languages, including object-oriented programming languages and conventional procedural programming languages. Code components may be embodied as procedures, methods or the like, and may comprise sub-components which may take a form of instructions or sequences of instructions at any of level of abstraction, from direct machine instructions of a native instruction set to high-level compiled or interpreted language constructs.

It will also be clear to one of skill in the art that all or part of a logical method according to particular embodiments of techniques discussed herein may suitably be embodied in a logic apparatus comprising logic elements to perform actions or procedures of above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, techniques discussed herein may be realised in a form of a signal carrier having functional signals and/or states thereon, said functional signals and/or states comprising functional computer data structures to, if loaded into a computer system or network and operated upon thereby, enable said computer system to perform actions or procedures of above-described methods.

It will be understood that, although terms first, second, etc. may be used herein to describe various features, these features should not be limited by these terms. These terms are only used to distinguish one feature from another. Furthermore, the term "and/or" includes any and all combinations of one or more of the associated listed items.

Furthermore, terminology used herein is for the purpose of describing embodiments only and is not intended to be limiting. For example, as used herein the singular forms "a", "an" and "the" are intended to include the plural forms as well, unless context clearly indicates otherwise. It will be further understood that terms "comprises," "comprising," "includes" and/or "including" as used herein, specify presence of stated features, integers, steps, operations, elements, and/or components, but do not preclude presence or addition of one or more other features, integers, steps, operations, elements, components, and/or groups thereof.

In the preceding description, various embodiments of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method of generating route instructions, the method comprising: electronically receiving, at a control system, route requests from a plurality of users comprising a first user and a second user, wherein the route requests comprise user preference data for the first and second users, respectively;

selecting, at the control system, paths from one or more path networks to satisfy the respective route requests, wherein the paths are selected to affect utilization of path capacity of paths in the one or more path networks, and wherein at least one path in the paths selected to satisfy a route request for the first user is selected in accordance with user preference data of the first user and wherein at least one path in the paths selected to satisfy a route request for the second user is selected contrary to user preference data of the second user; generating, at the control system, route instructions for the respective route requests, wherein the route instructions comprise the selected paths; and transmitting, from the control system to the plurality of users, the respective route instructions.

2. The method of claim 1, further comprising:
monitoring, at the control system, the selected paths; and
determining, at the control system, failure of a first path of the selected paths or predicted failure of the first path to satisfy the one or more path criteria.

3. The method of claim 2, further comprising:
selecting, at the control system, a second path from the path network to replace the first path, wherein second path is selected based, at least in part, on or responsive to one or more path criteria for the second path;
generating, at the control system, updated route instructions for the respective route requests, wherein the updated route instructions comprise the second path; and
transmitting, from the control system to the plurality of users, the respective updated route instructions.

4. The method of claim 2, further comprising: modifying, at the control system, one or more path criteria for the first path responsive to determination of failure of the first path or prediction of failure of the first path to satisfy the one or more path criteria for the first path.

5. The method of claim 2, further comprising:
generating, at the control system, a warning for one or more users responsive to determination that the first path fails or is predicted to fail to satisfy the one or more path criteria.

6. The method of claim 1, wherein the one or more path criteria relate to one or more of: a path capacity, a path volume, a path weight and/or a user criteria.

7. The method of claim 1, further comprising:
determining whether the respective paths satisfy the one or more path criteria based, at least in part, on or responsive to a current path.

8. The method of claim 1, further comprising:
determining whether the respective paths satisfy the one or more path criteria based, at least in part, on or responsive to predicted paths.

9. The method of claim 8, wherein the predicted paths comprise one or more of: attributes, event features, and/or vehicle signals and/or states.

10. The method of claim 9, comprising:
accessing a data resource to harvest the event features.

11. The method of claim 9, comprising:
receiving, at the control system, the event features.

12. The method of claim 6, wherein the respective paths are selected based, at least in part, on or responsive to one or more user criteria to prioritise a first user over a second user.

13. The method of claim 12, wherein the respective paths are selected based, at least in part, on or responsive to one or more user criteria to reduce risk of a first user traversing a path from which the first user is restricted.

14. The method of claim 1, further comprising:
receiving, at the control system, one or more current paths from the plurality of users.

15. The method of claim 1, further comprising:
transferring a responsibility for the user to a different control system.

16. The method of claim 1, wherein the one or more path criteria of the respective paths are set to provide a path performance for the respective paths.

17. The method of claim 1, wherein the plurality of users comprises one or more of: a partially autonomous vehicle and/or a fully autonomous vehicle.

18. A control system comprising:
a processor coupled to a memory, the control system to:
select paths from one or more path networks to satisfy route requests to be received from a plurality of users, wherein the route requests comprise user preference data for respective users of the plurality of users, wherein the paths are to be selected based, at least in part, on or responsive to one or more path criteria for the respective paths and to affect utilization of path capacity of paths in the one or more path networks wherein at least one path of the one or more paths is selected contrary to user preference data of at least one user of the plurality of users;
generate route instructions for the respective route requests, wherein the route instructions are to comprise the selected paths; and transmit the route instructions through to the plurality of users.

19. A method of implementing route instructions at a route device of a network comprising two or more route devices, the method comprising:
transmitting, from route device to a control system, a route request comprising a request for directions from an origin location to a destination location;
receiving, at the route device, route instructions comprising one or more paths, the one or more paths being selected based, at least in part, on or responsive to one or more path criteria and to affect utilization of path capacity of paths in one or more path networks; wherein at least one path of the one or more paths is contrary to user preference data of the route device; and
implementing, at the first route device, the route instructions.

20. The method of claim 19, wherein implementing the route instructions comprises:
providing text, graphical or voice instructions for a user based, at least in part or responsive to electronic signals received at the first route device.

* * * * *